United States Patent [19]

Fisher

[11] Patent Number: 5,107,375
[45] Date of Patent: Apr. 21, 1992

[54] REAR VIEW MIRROR FOR DRIVER ASSISTANT OR TRAINER

[76] Inventor: J. Charles Fisher, P.O. Box 88, Delaware, Iowa 52036

[21] Appl. No.: 606,709

[22] Filed: Oct. 31, 1990

[51] Int. Cl.$^5$ .......................... B60R 1/06; B60R 1/08; G02B 7/18; G02B 5/08
[52] U.S. Cl. .................................. 359/850; 359/865; 359/613
[58] Field of Search .............. 350/612, 626, 601, 616, 350/283, 277, 627, 580, 584, 276 R

[56] References Cited

U.S. PATENT DOCUMENTS

| | | |
|---|---|---|
| 3,133,139 | 5/1964 | Beers ................................. 350/276 R |
| 3,954,328 | 5/1976 | Ames . |
| 4,248,497 | 2/1981 | Leighton ............................ 350/584 |
| 4,253,738 | 3/1981 | Linkous ............................. 350/616 |
| 4,504,118 | 3/1985 | Harig ................................. 350/626 |
| 4,577,929 | 3/1986 | Guilleh ............................. 350/584 |
| 4,678,294 | 7/1987 | Van Nostrand . |
| 4,863,254 | 9/1989 | Dyer . |
| 4,906,085 | 3/1990 | Sagihara ............................ 350/601 |

FOREIGN PATENT DOCUMENTS

| | | |
|---|---|---|
| 2331633 | 6/1974 | Fed. Rep. of Germany ...... 350/627 |
| 1478825 | 4/1966 | France ............................... 350/626 |
| 62-20744 | 1/1987 | Japan . |
| 1172382 | 11/1969 | United Kingdom ............... 350/601 |

*Primary Examiner*—Jon W. Henry

[57] ABSTRACT

A safety rear view mirror for vehicles with a restricted field of view is mounted in a preferred position between a standard external rear view mirror on the side of the vehicle opposite the driver's side and the vehicle. The safety rear view mirror or simply safety mirror is positioned to be observed by a driver trainer or driver assistant sealed in a seat adjacent the driver's seat. The position of the safety mirror may be such with respect to the structure of the cab of the vehicle that the safety mirror may not be observed by the driver of the vehicle, hence, that it is only accessible to the driver assistant. In a preferred embodiment the safety mirror includes a safety shield which is disposed between the reflective element of the safety mirror and the driver of the vehicle. The safety shield may be adjusted to an optimum position in which the safety shield restricts the driver's view of the safety mirror in cases where the mirror can not be conveniently mounted to be observable by the driver assistant only. The safety shield protects the driver from receiving a double image of the rear field of view to thereby allow the driver to concentrate on the image observed through the standard external rear view mirror.

5 Claims, 1 Drawing Sheet

U.S. Patent          Apr. 21, 1992          5,107,375
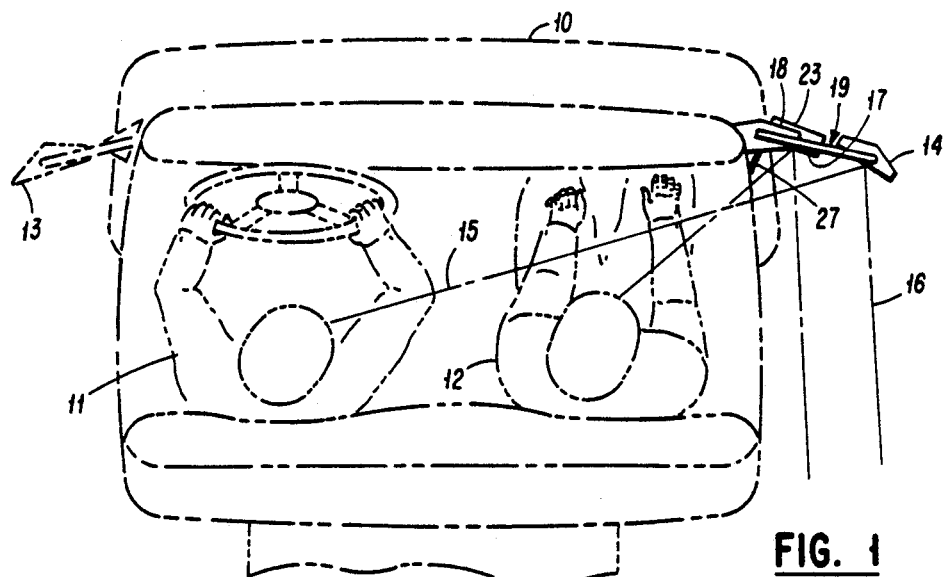
FIG. 1
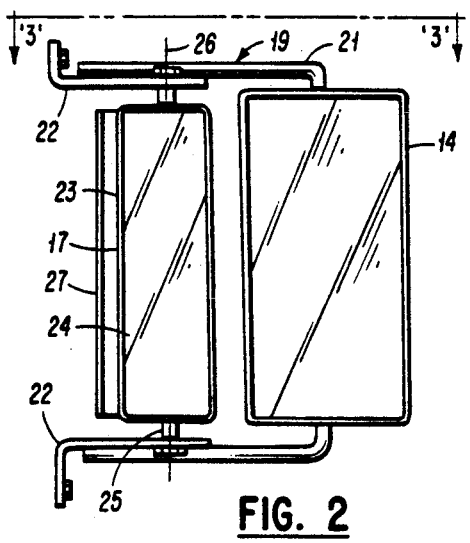
FIG. 2
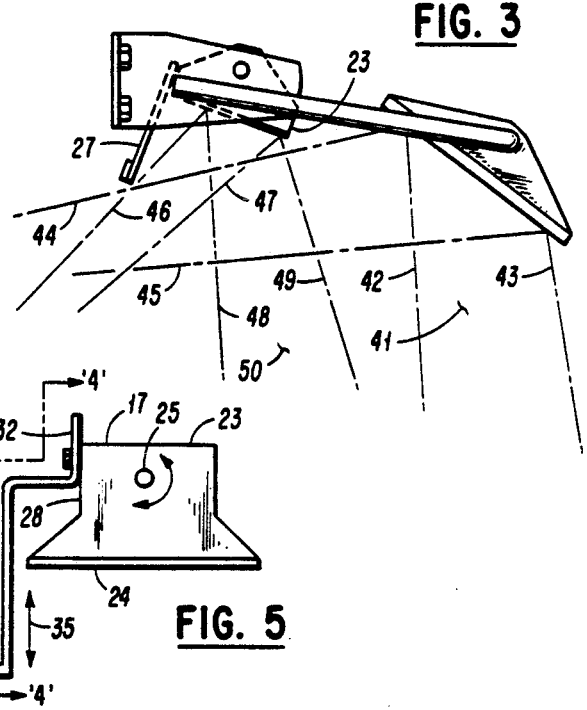
FIG. 3
FIG. 5
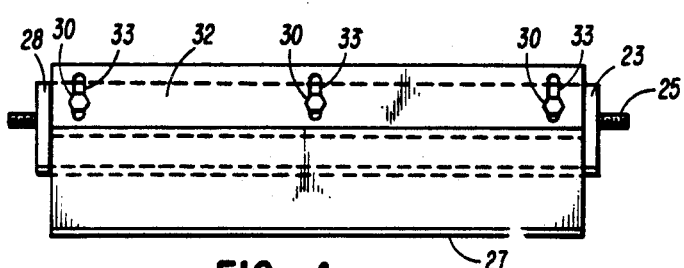
FIG. 4
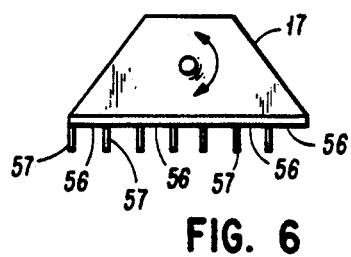
FIG. 6

REAR VIEW MIRROR FOR DRIVER ASSISTANT OR TRAINER

BACKGROUND OF THE INVENTION

1. Field of the Invention

The invention relates generally to rear mirrors for motor vehicles and more particularly to rear mirrors for use by persons other than the driver of a vehicle.

2. Discussion of the Prior Art

Vehicles having restricted fields of view, such as trucks, recreational vehicles or other vehicles pulling trailers, rely on external rear view mirrors to enhance the field of view of the person driving the vehicle. A driver's attention while driving a vehicle is typically directed toward the front of the vehicle. While driving in a right lane, a driver may observe from the left-hand driver's seat the left lane behind the vehicle by casting a quick glance into, for example, the left-hand outside mirror of the vehicle. If the vehicle has a restricted field of view toward the rear, a right-hand outside rear view mirror is typically required to afford the driver a view toward the right of the vehicle, as would be needed for a lane change toward the right.

To observe traffic conditions on the left rear side of the vehicle, a driver sitting in the left driver's seat of a vehicle only needs to turn his or her head through a relatively small angle away from the forward viewing direction. On the other hand, to look into a rear view mirror on the right side of the vehicle, for example, to quickly ascertain whether a lane change to the right is permissible, a driver's view needs to be turned through a considerable angle toward the right and away from the forward direction of the vehicle. Thus, the left rear of a truck, for example, may be observed while typically still viewing the forward direction with peripheral vision. On the other hand, looking toward the right rear of a truck requires, that almost all of a driver's attention is directed away from the main direction of travel.

The right-hand rear of a truck, consequently, holds greater dangers that a vehicle may inadvertently be overlooked and that an accident may happen. It is also realized that the danger of a driver missing the presence of a vehicle on the right-hand side may be greater when the driver is inexperienced than when a driver has already gained many hours of experience in driving view-obstructed vehicles. For example, it is not unusual for transportation companies to provide driver trainers for newly employed drivers. The driver trainers provide instruction to the new drivers and seek to reduce the risk of accidents during the time the newly hired driver becomes acquainted with the equipment. Because of the increased risk factors involved in steering a vehicle toward the side opposite the driver's side, it is desirable to allow the trainer or, more generally, the person sitting next to the driver to keep the side and rear opposite to the driver's side in view during maneuvers of the vehicle to that critical side. These maneuvers include not only lane changes but understandably also turns of the vehicle to that side.

SUMMARY OF THE INVENTION

The present invention addresses problems related to the discussed shortcomings with rear-view obstructed vehicles, particularly as they may pertain to relatively less experienced drivers or drivers in special traffic conditions that may need the help of a person in the jump seat adjacent to that of the driver. As described above, in training situations a trainer or instructor may occupy the jump seat next to the driver. In that it may be necessary for the driver trainer to give instructions to the driver of the vehicle, a right-hand rear view capability for the trainer is desirable.

It appears however, that a rear view mirror adjusted to allow a desired field of view to the right rear of a vehicle from the seat next to that of the driver, the rear view mirror when accidentally consulted by the driver may erroneously hide from view a car or other object on such right hand side. Thus, while reducing the risk of accident on the one hand by affording the right hand side to tbe checked by a person other than the driver, the use of the mirror by the driver is undesirable.

With the scope of the invention it is, therefore, contemplated to provide a rear view mirror for a person sitting in the seat next to the driver's seat, which rear view mirror is not accessible for accidental use from the driver's seat.

It is also contemplated to provide in a vehicle with obstructed rear vision, and with a driver's seat on the left side of the vehicle, an outside rear view mirror having a restricted angle of incidence, and a provision for mounting the mirror on a vehicle to afford a person sitting on a right-hand seat next to the driver's seat a field of view toward the right side and rear of the vehicle and for restricting the driver of the vehicle from viewing the mirror.

Other features and advantages of the invention will become apparent from the detailed description of the invention in reference to a preferred embodiment thereof.

BRIEF DESCRIPTION OF THE DRAWINGS

The description of a particular embodiment of the invention may be best understood when the detailed description is read in reference to the appended drawings wherein:

FIG. 1 shows a somewhat simplified top view of a cab of a motor vehicle including a driver and driver assistant, showing particularly a structure of a right-hand rear mirror assembly in accordance with the present invention;

FIG. 2 is a generally frontal view of the right-hand rear view mirror assembly as seen from the right rear of the vehicle depicted in FIG. 1;

FIG. 3 is a top view of the right-hand rear view mirror assembly shown in FIG. 2, viewed in the direction "3—3".

FIG. 4 is an end view of the mirror of a particular embodiment of the right-hand rear view mirror, a top view of which is shown in FIG. 5, showing particulars of the current invention;

FIG. 5 is a top view of the mirror shown in FIG. 4, showing in greater detail the position of a shield which restricts the accessibility of the mirror to the driver, as further described herein; and FIG. 6 is a top view of an alternate embodiment of a right-hand mirror, showing in particular another structure for restricting access by the driver to the mirror.

DETAILED DESCRIPTION OF THE INVENTION

FIG. 1 shows in phantom lines a top view of a portion of a vehicle, namely the cab 10, and depicts therein a driver 11 and a driver assistant 12 in their respective positions in the cab 10. The vehicle may be any vehicle in which a driver assistant, trainer, driving instructor or examiner may sit in the seat next to the actual driver of the vehicle. A left-hand rear mirror 13 is accessible to the driver 11. On the other side of the cab 10, a right-hand rear mirror 14 is more remotely located and affords the driver a more restricted field of vision. In fact, the mirror 14 is located at almost twice the distance from the driver than the mirror 13 on the left-hand of the cab. Since right-hand traffic flow patterns generally have been adopted throughout the world, the invention is particularly described with respect to a vehicle which has a left-hand driver seat, hence is designed for right-hand flow of traffic. It should be understood that in the exceptional case in which the driver of a vehicle sits on the right-hand side of the vehicle, the sides of the described elements may be readily reversed.

As shown in FIG. 1, a line of vision from the driver 11 to the right-hand rear view mirror 14, as shown at 15 also depicts the considerable angle with respect to a forward direction through which the driver 11 needs to his or her head to check for traffic on the right rear of the truck, the rearward direction of view being indicated a line of reflection 16. The driver assistant 12, seeking to watch for traffic on the right rear of the vehicle will be unable to see toward the rear of the cab 10 when looking from a typical head position toward the right rear view mirror 14, the mirror 14 being adjusted for the driver 11 as shown by the line of sight 15. The angle of vision through the mirror 14 would allow the driver assistant 12 at most to view the side of a trailer that might be drawn by a cab 10. If the driver assistant leans forward to change the field of view to that of the driver 11, then the head moves into the field of view of the driver, thus interfering with the driver's rear vision on the right side of the cab 10. To overcome these deficiencies and to allow the driver assistant 12 to also participate in checking for traffic on the right side of the cab 10 without interfering with the field of vision of the driver 11, a second right-hand mirror 17, which may be referred to as a safety mirror, is fitted preferably onto an inboard portion 18 of a frame assembly 19 by which the right-hand mirror 14 is mounted to the cab 10. The frame assembly 19 engages the mirror 17 and supports the mirror 17 in an inboard position between the outside mirror and the vehicle or cab 10. Ideally in such inboard position, the safety mirror 17 may be hidden from view by the driver 11 of the vehicle.

The second mirror 17 is adjusted at an angle to afford the driver assistant 12 substantially the same or an even better field of view on the right side as that available to the driver 11. Though not needed for practicing the invention, one may prefer to provide a mark or detent position to maintain the mirror oriented in the defined position from which the driver assistant 12 may observe the prescribed rear view from the cab 10. FIG. 2 shows the right-hand mirrors 14 and 17 mounted to the frame assembly 19, which may consist of a "U"-shaped tubular frame member 21, for example, which frame member is mounted to the cab 10, such as by "L"-shaped mounting brackets 22.

The second mirror 17, which may also be referred to as "jump seat" mirror in addition to safety mirror 17, includes a structural housing or case 23 which peripherally holds and supports the reflective mirror pane or element 24. A mounting rod 25 may preferably extend longitudinally through the case 23. The mounting rod 25 is attached at the bottom and the top either to the frame member 21 or to the mounting brackets 22, to allow the mirror 17 to be pivotally adjusted about a vertical axis 26. Such pivotal adjustment would give the driver assistant 12 the best possible field of view independently of the setting of the mirror 14.

A possible safety hazard might be generated by the presence of the safety mirror 17, particularly when the mirror 17 can only be located with respect to the cab 10 such that it is clearly in the field of view of the driver 11. If the driver 11 is not used to the presence of the second mirror 17 and only the driver 11 is present in the cab 10 while driving, then the presence of the safety mirror 17 may be distracting to the driver. The driver 11, casting a quick view to the right to focus on the traffic in the right-hand lane might be exposed to the double image or double field of view afforded by the presence of the two mirrors 17 and 14. To obtain a correct assessment of the traffic situation on the right-hand side of the cab 10, the driver 11 would need additional time to concentrate on the main right-hand mirror 14, and to discard a false image available from the safety mirror 17. This may be extremely distracting during a short time allowed to the driver to divert attention from the traffic straight ahead. This condition is dealt with in accordance with the invention by a safety shield 27 which is interposed between the driver 11 and the reflective element, the mirror pane 24. In a preferred embodiment, the safety shield 27 is mounted to the outside of the case 23 and extends through the plane of the mirror pane 24. The shield extends forward of the plane of reflection of the mirror 17 to an optimum position forward of the plane, shielding in such optimum position the mirror 17 from the driver's field of view, as shown in FIG. 3. On the other hand, the shield 27 does not block the driver assistant 12 from visual access to the mirror 17, in that the driver assistant is sitting on the right-hand side of the driver and views the safety mirror from a different angle.

FIG. 4 shows a preferred mode of attaching the safety shield 27 to the case 23 as illustrated in the side view of the mirror 17. A side surface 28 of the case 22 may, for example, include such fastening supports as tapped apertures (not visible) for mounting the shield 27 with typical screws or bolts 30. A mounting surface 32 of the shield 27 preferably features mounting slots 33. The slots 33 permit the shield 27 to be moved outward or inward with respect to the plane of reflection of the mirror 17 to provide the proper shielding of the field of view from the driver 11 when the driver assistant 12 desires a small angular adjustment about the mounting rod 25.

FIG. 5 further illustrates the direction of adjustment of the shield 27 in the directions indicated by the arrow 35. The direction of rotational adjustment of the mirror 17 is indicated by the rotational arrow 36 about the rod 25. FIG. 3 shows the approximate relative positions of the mirrors 14 and 17. A field of view which may correspond to that of the driver 11 is indicated by an area 41 between lines of reflection 42 and 43 from the mirror 14. The lines of reflection 42 and 43 correspond to the incident lines 44 and 45, respectively. The incident line 44 adjacent the mirror 17 passes the shield 27 and the mirror 17. On the other hand, similar incident lines 46 and 47, and lines of reflection 48 and 49 define a field of view of the driver assistant 12 to the right rear of the cab that approximates that of the driver 11 through the mirror 14.

The invention has been described with respect to a particular example of a safety mirror 17 for a truck, recreational vehicle or any other application in which restricted visibility or particular requirements may necessitate the presence of a driver assistant 12. It should be understood that within the scope of disclosure, changes and modifications in the structure of the described embodiment are possible without departing from the spirit and scope of the invention as described herein. In some instances, it may be desirable to delete the safety shield 27. Though the advantages of the safety shield 27 have been described, it should be realized that with proper training, both the driver 11 and the driver assistant 12 may benefit from the combination of the described mirrors 14 and 17, even though the safety shield may be missing or may have been removed.

Another modification of the described embodiment, as shown in FIG. 6, contemplates the vertical sectoring of the mirror pane 24 into a plurality of mirror strips 56, each having toward the driver's side a corresponding safety shield 57 which extends above the reflective plane of the mirror strips 56 and partitions adjacent ones of the mirror strip 56, and which performs the same function with respect to the corresponding mirror strip 56 as the safety shield performs with respect to the mirror pane 24. Such a modification is currently not preferred, though it may become desirable in the future. As described, the sectored mirror may be more difficult to view by the driver assistant 12, for example, and special training may be needed. The modification is shown as one of a number of possible modifications that are possible without departing from the spirit and scope of the invention.

What is claimed is:

1. A combination of two external rear view mirrors disposed on a side of a vehicle opposite the driver's side, a first one of the mirrors oriented to afford to the driver of the vehicle a field of view toward the rear on the side at which the first mirror is mounted, a second of the two rear view mirrors being oriented to afford to a person next to the driver a field of view toward the rear on the same side of the vehicle as the first of the combination, the second rear view mirror comprising a shield disposed on a side of the second rear view mirror, which side substantially faces toward the driver of the vehicle, the shield extending from the side of the second rear view mirror through the plane of reflection thereof and into the driver's field of view with respect to the second rear view mirror, thereby positively restricting the driver's view from observing an image on the reflective element of said second rear view mirror, said position on the side of the second rear view mirror unblocking the second rear view mirror with respect to the person next to the driver, whereby the person next to the driver has visual access to the second rear view mirror.

2. The combination of two external rear view mirrors according to claim 1, wherein the shield comprises means for adjusting the shield into and out of the field of view of the driver to adjust the shield in response to a pivotal repositioning movement of the mirror.

3. A safety rear view mirror for use on a driver operated vehicle and on a side of the vehicle opposite the driver's side, the driver's side of the vehicle having a seat for the driver, said side opposite the driver's side having a driver rear view mirror mounted externally of the vehicle for use by the driver, said side opposite the driver's side further having a seat for a person to sit adjacent the driver, said safety rear view mirror comprising:
  a case including means for mounting the case pivotally about a vertical axis;
  a reflective mirror element disposed in the case and supported by the case;
  means for engaging the mounting means for supporting the safety rear view mirror between the driver rear view mirror and said vehicle with an orientation to be accessible by a person seated in the seat adjacent the driver's seat; and
  means for restricting a field of view of the driver, when seated in the driver's seat, toward the reflective element of the mirror, the field of view restricting means extending from a side of the case disposed toward the driver and next to the reflective element through the plane of reflection of the reflective element and into the field of view between the driver and the reflective element, to restrict the driver of the vehicle from viewing the reflective element when the mirror is oriented to be viewed by said person seated in the seat adjacent the driver's seat.

4. The safety rear view mirror according to claim 3, wherein the field of view restricting means is a shield disposed adjacent the reflective element of the mirror, said shield being adjustably mounted to the case for movement above a reflective plane of the safety rear view mirror into and out of the field of view of the driver toward said reflective element.

5. The safety rear view mirror according to claim 3, wherein the field of view restricting means is at least one shield extending from the plane of the reflective element of the safety mirror.

* * * * *